(12) United States Patent
Bezryadin et al.

(10) Patent No.: US 6,941,331 B2
(45) Date of Patent: Sep. 6, 2005

(54) INTERPOLATION OF VIDEO AND AUDIO DIGITAL DATA

(75) Inventors: Sergey N. Bezryadin, San Francisco, CA (US); Michael Shenker, Sunnyvale, CA (US)

(73) Assignee: KWE International, Inc., San Francisco, CA (US)

( * ) Notice: Subject to any disclaimer, the term of this patent is extended or adjusted under 35 U.S.C. 154(b) by 662 days.

(21) Appl. No.: 10/146,188

(22) Filed: May 14, 2002

(65) Prior Publication Data

US 2003/0215151 A1 Nov. 20, 2003

(51) Int. Cl.[7] .................................................. G06F 7/38
(52) U.S. Cl. ........................................ 708/290; 708/313
(58) Field of Search .............................. 708/290, 313; 382/199, 266; 348/448

(56) References Cited

U.S. PATENT DOCUMENTS

| | | | | |
|---|---|---|---|---|
| 5,051,826 A | * | 9/1991 | Ishii et al. .................. | 348/448 |
| 5,212,740 A | * | 5/1993 | Paek et al. .................. | 382/266 |
| 5,262,958 A | | 11/1993 | Chui et al. | |
| 5,463,697 A | * | 10/1995 | Toda et al. ................. | 382/199 |
| 5,835,034 A | | 11/1998 | Seroussi et al. | |
| 6,144,773 A | | 11/2000 | Kolarov et al. | |
| 6,674,906 B1 | * | 1/2004 | Han et al. ................... | 382/199 |

OTHER PUBLICATIONS

"Building your own wavelets at Home", in *Wavelets in Computer Graphics*, pp. 15–87, ACM SIGGRPH Course notes, 1996, available on Wide World Web at http://cm.bell–labs.com/who/wim/papers/papers.html#athome.

Editor Martin Boliek, Co–editors Charilaos Christopoulos, and Eric Majani, "JPEG 2000 Part 1 Final Committee Draft version 1.0", ISO/IEC JTCI/SC29 WG1, JPEG 2000 dated Mar. 16, 2000, pp. 1–190.

Rabbani Majid et al., "An overview of the JPEG 200 still image compression standard", Signal Processing: *Image Communication* 17 (2002), pp. 3–48.

R.L. Claypoole, Jr. et al., "Nonlinear Wavelet Transforms for Image Coding via Lifting", Submitted to IEEE Transactions on Image Processing (EDICS #s: 1–STIL and 2–WAVP, Aug. 25, 1999).

"Wavelets and the Lifting Scheme, A 5 Minute Tour", by W. Sweldens, Department of Computer Science, Katholieke Universiteit Leuven, Celetijnenlaan 200A, B 3001 Heverlee, Belgium.

Sweldens, Wim, "The Lifting Scheme: A New Philosophy in Biorthogonal Wavelet Constructions", (12 pages).

(Continued)

*Primary Examiner*—Chuong D. Ngo
(74) *Attorney, Agent, or Firm*—Michael Shenker; MacPherson Kwok Chen & Heid LLP

(57) ABSTRACT

In the process of interpolation of video and/or audio digital data $S_n$, an interpolated value is chosen depending on whether or not an edge is detected. The edge detection is performed as follows. Let $L=|S_{2n}-S_{2n-2}|$, $C=|S_{2n+2}-S_{2n}|$, and $R=|S_{2n+4}-S_{2n+2}|$. An edge is detected when $R>9(C+L)$ or $L>9(C+R)$. A predictor $P_{2n+1}=K_1 S_{2n}+K_2 S_{2n+2}$ provides the interpolated value for $S_{2n+1}$ when an edge is detected, where $K_1=k_L/(k_L+k_R)$, $K_2=k_R/(k_L+k_R)$, where $k_L=1/(1+L)$, $k_R=1/(1+R)$ or $k_L=d_{2n+1,2n+2}/(1+L)$ and $k_R=d_{2n,2n+1}/(1+R)$. A different predictor (e.g. a cubic predictor) is used when no edge is detected. Other embodiments are also provided.

21 Claims, 3 Drawing Sheets

OTHER PUBLICATIONS

Sweldens, Wim, "The Lifting Scheme: A Construction of Second Generation Wavelets", May 1995, Revised Nov. 1996, To appear in SIAM J.

Claypoole, Roger et al., "Nonlinear Wavelet Transforms For Image Coding", Nov. 1997, pp. 1–10.

W. Sweldens, P. Schröder, "Building your own wavelets at Home", in *Wavelets in Computer Graphics*, pp. 15–87, ACM SIGGRPH Course notes, 1996, available on Wide World Web at http://cm.bell–labs.com/who/wim/papers/papers.html#at home.

* cited by examiner

INTERPOLATION OF VIDEO AND AUDIO DIGITAL DATA

BACKGROUND OF THE INVENTION

The present invention relates to digital data processing, and more particularly to interpolation of video and audio digital data. Video data may represent a still image or a moving picture.

Data interpolation is widely technique in digital data processing. One example is data compression employing a fast wavelet transform. See W. Sweldens, P. Schröder, "Building your own wavelets at Home", in *Wavelets in Computer Graphics*, pages 15–87, ACM SIGGRPH Course notes, 1996, available on Wide World Web at http://cm.bell-labs.com/who/wim/papers/papers.html#athome, incorporated herein by reference. A fast wavelet transform based on a lifting scheme uses prediction. Some data values are replaced with the differences between the data value and some predicted value. Let a set of samples $S_0, S_1 \ldots S_{N-1}$ represent an original signal S. This set can be a sequence of digital image data values (video data values) at consecutive image points (pixels). These values may be the values of some component of RGB, YCbCr, or some other color representation. This set is subdivided into two subsets. On subset is the set of even samples $S_0, S_2, S_4 \ldots$, and the other subset is the set of odd samples $S_1, S_3, S_5 \ldots$. The even samples are modified with a weighted sum of the odd samples to form a set of low-pass coefficients representing a downsampled low-resolution version of the original set. For the odd indices of the form $2_{n+1}$ (n=0, 1, . . . ), the wavelet transform replaces the odd sample values $S_{2n+1}$ with the differences $$Y_{2n+1}=S_{2n+1}-P_{2m+1} \qquad (1)$$

where the predicted value $P_{2n+1}$ is a function of the even sample values. $P_{2n+1}$ can be calculated by interpolation.

The high pass coefficients $Y_{2n+1}$ form a downsampled residual version of the original data set. The original data set can be perfectly reconstructed from the low pass coefficients and the high pass coefficients.

The low pass coefficients can be processed with another iteration of the fast wavelet transform.

If the prediction P is good, then the set of the high pass coefficients will have many zeroes and small values. Consequently, separate compression of the high pass coefficients will yield a high compression ratio when compression techniques such as quantization, Huffman coding, Zero Tree coding, or others are employed.

Good prediction can be obtained for a well correlated signal S if the predictor $P_{2n+1}$ is a value of a polynomial that coincides with the signal S at even points near $2_{n+1}$. For example, $P_{2n+1}$ can be the value at point 2n+1 of a cubic polynomial which coincides with S at points 2n−2, 2n, 2n+2, 2n+4. We will denote this "cubic predictor" as $P^{(1)}$. It can be shown that if consecutive pixels 0, 1, 2 . . . are equidistant from each other then:

$$P^{(1)}_{2n+1}=(-S_{2n-2}+9S_{2n}+9S_{2n+2}-S_{2n+4})/16 \qquad (2)$$

JPEG standard 2000, as described in "JPEG 2000 Final Committee Draft version 1.0", dated Mar. 16, 2000, recommends using the cubic predictor for lossy compression. For lossless compression, JPEG standard 2000 recommends a linear predictor given by the following equation:

$$P_{2n+1}=P^{(2)}_{2n+1}=(S_{2n}+S_{2n+2})/2 \qquad (3)$$

With the lossy compression the following problems have been observed. If the prediction uses the linear predictor $P^{(2)}$, the edges (the regions of an abrupt change of S) become smeared. If the cubic predictor $P^{(1)}$ is used, the image areas near the edges contain artifacts. Higher order polynomial predictors result in more artifacts.

In some wavelet transform implementations, the predictor value depends on whether or not an edge is detected. We will call such predictors "edge dependent". In one implementation, if no edge is detected near a point 2n+1, the predictor value $P_{2n+1}$ is calculated as the cubic value $P^{(1)}_{2n+1}$ or the value of some higher order polynomial predictor. If an edge is detected, the predictor value $P_{2n+1}$ is the linear value $P^{(2)}$. The results achieved with this method depend on the edge detection technique. According to one article, an edge can be detected by determining if the data S is "well approximated by a low order polynomial." See R. L. Claypoole, Jr. et al., "Nonlinear Wavelet Transforms for Image Coding via Lifting", Submitted to IEEE Transactions on Image Processing (EDICS #'s: 1-STIL and 2-WAVP, Aug. 25, 1999).

It is desirable to find good edge detection techniques that provide good prediction for many images (and hence good image reconstruction with lossy compression) and are simple to implement with a computer or other digital circuitry. It is also desirable to find good predictors (simple to implement and providing good prediction) for use with both edge dependent and edge independent wavelet transforms. Further, interpolation based on edge detection and prediction can be employed for compression of any digital signal correlated in space or time. Possible applications include photography, moving pictures, ultra sound imaging (tomography), poly-dimension object modeling, and others. Digital zoom can be implemented with a reverse wavelet transform by setting the high pass coefficients to zero. Good interpolation techniques are desirable.

SUMMARY

Some embodiments of the present invention provide edge detection techniques which yield good results for lossy compression for large classes of digital data and which can be efficiently implemented with digital circuitry. New predictors are also provided that can be used with edge dependent and edge independent interpolation.

The invention is defined by the appended claims which are incorporated into this section by reference.

DESCRIPTION OF SOME EMBODIMENTS

In some embodiments, the edge detection is performed as follows. Let $$L=|S_{2n}-S_{2n-2}|$$

$$C=|S_{2n+2}-S_{2n}|$$

$$R=|S_{2n+4}-S_{2n+2}| \qquad (4)$$

An edge is detected near point 2n+1 if R is large compared to L and C or if L is large compared to R and C. In one embodiment, the edge is detected if one of the following conditions is true:

$$R>9(C+L) \quad (5)$$

or $$L>9(C+R) \quad (6)$$

Figure 1:
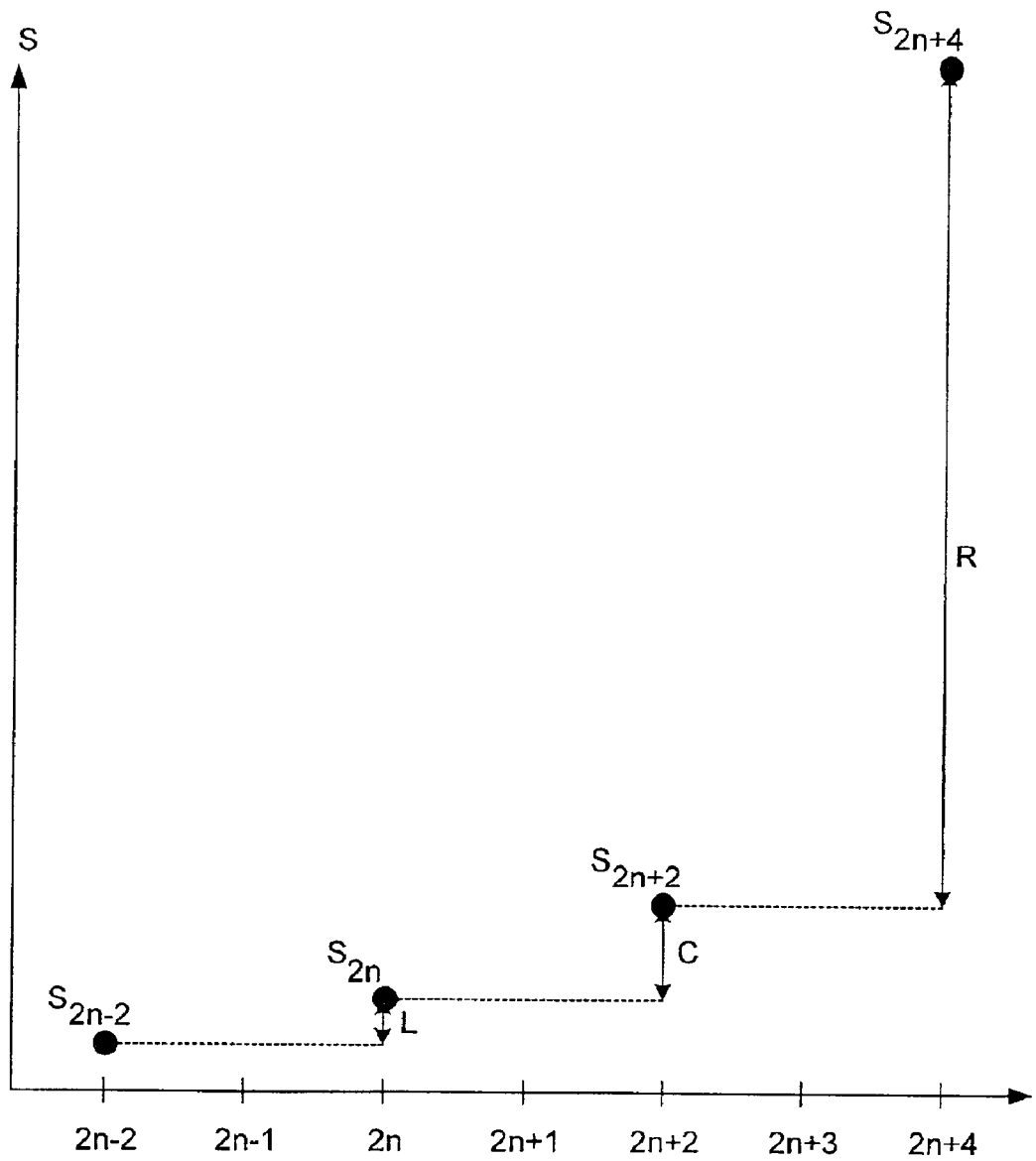
FIGS. 1 and 2 are graphs that illustrate edge detection techniques according to some embodiments of the present invention.
Figure 2:
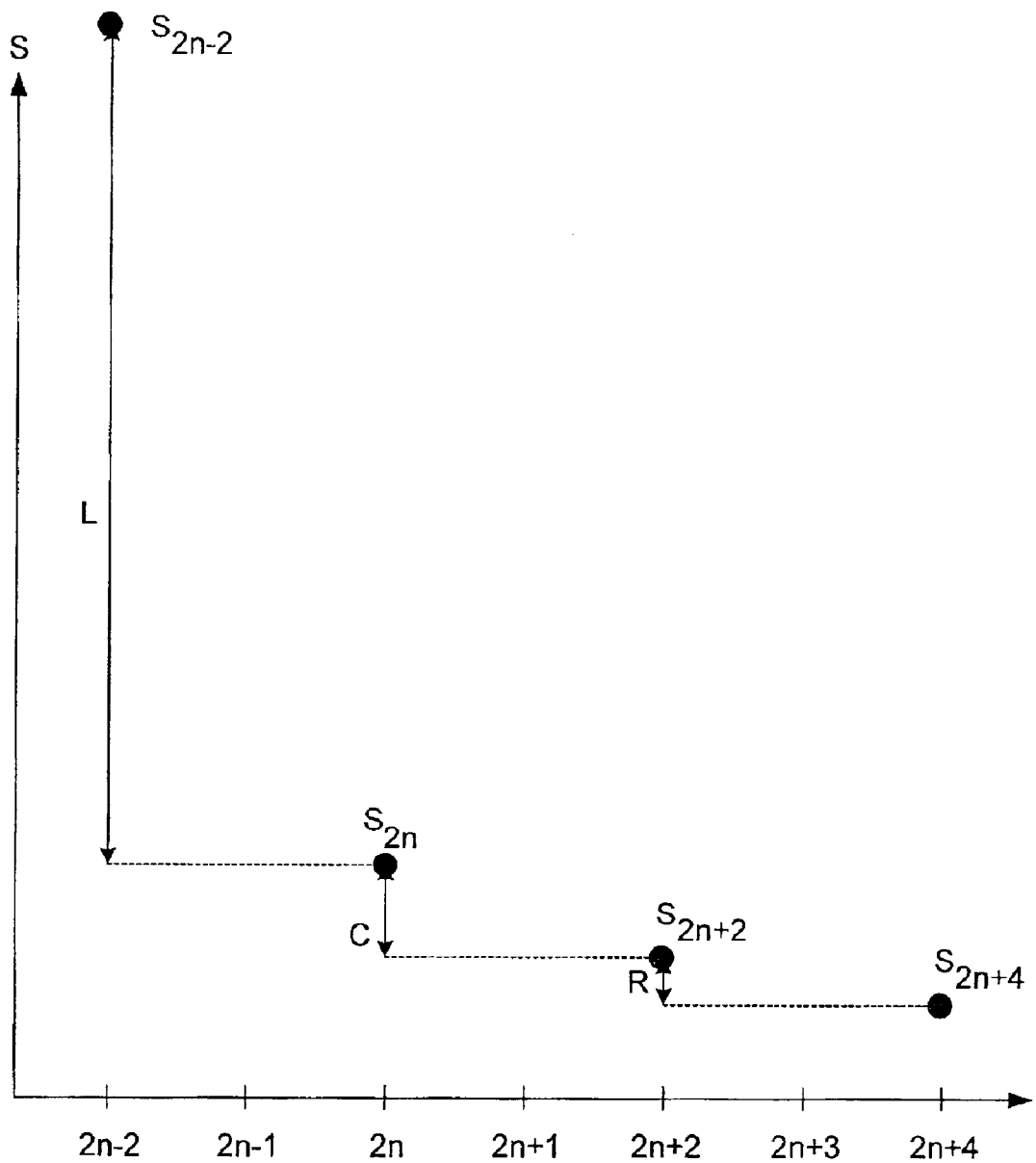

The case (5) is illustrated in FIG. 1. The case (6) is illustrated in FIG. 2. In one embodiment, if no edge is detected according to the relations (5) and (6), the predictor $P_{2n+1}$ is determined according to the cubic equation (2). If an edge is detected, $P_{2n+1}$ is determined from the linear equation (3). Other predictors can also be used for the case when an edge is detected or the case when no edge is detected.

The conditions (5) and (6) are obtained from the following considerations. Suppose:

$$S_{2n-2}=S_{2n}=0$$

$$S_{2n+4}>0 \quad (7)$$

If the S data are smooth near $S_{2n+1}$, then both $S_{2n+1}$ and $S_{2n+2}$ should be positive. Let us examine for which values of $S_{2n+2}$ and $S_{2n+4}$ the cubic predictor value $P^{(1)}_{2n+1}$ is positive. Substituting zeroes for $S_{2n-2}$ and $S_{2n}$ in the equation (2), we obtain:

$$P^{(1)}_{2n+1}=(9S_{2n+2}-S_{2n+4})/16 \quad (8)$$

The cubic predictor is positive if $S_{2n+4}<9S_{2n+2}$. If $S_{2n+4}>9S_{2n+2}$, the cubic predictor is negative, and the linear predictor $P^{(2)}_{2n+1}$ is likely to provide better prediction. If the relations (7) hold true, and $S_{2n+2}>0$, then the condition $S_{2n+4}>9S_{2n+2}$ implies:

$$R>8(C+L) \quad (9)$$

This is a somewhat more relaxed condition than (5). Some embodiments use the condition (9) instead of (5).

In some embodiments, an edge is detected when:

$$R>k(C+L) \quad (10)$$

or $$L>k(C+R) \quad (11)$$

where k a predetermined positive constant. In some embodiments, k is 8, 10 or 11. Other values can also be used.

In some embodiments, an edge is detected when:

$$R>F(C, L) \quad (12)$$

or $$L>F(C, R) \quad (13)$$

where F(x, y) is some increasing positive function of x and y. For example, F(x, y) can be 10*max(x, y) or some other function.

In the inequalities (5), (6), (9)–(13), the greater-than sign ("$>$") can be replaced with the greater-than-or-equal-to sign ("$\geq$").

The parameters L, C, R (equations (4)) indicate the absolute value of the rate of change of the sequence of the even samples $S_m$ from $S_{2n-2}$ to $S_{2n}$, from $S_{2n}$ to $S_{2n+2}$, or from $S_{2n+2}$ to $S_{2n+4}$ respectively, where the rate of change is with respect to the position coordinate m. In some embodiments, the points m=0, 1, 2, 3 may or may not be equidistant from each other. If they are not equidistant, let $d_{n1,n2}$ be the distance between the points n1 and n2. Then L, C, R can be defined as follows:

$$L=|S_{2n}-S_{2n-2}|/d_{2n-2,2n}$$

$$C=|S_{2n+2}-S_{2n}|/d_{2n,2n+2}$$

$$R=|S_{2n+4}-S_{2n+2}|/d_{2n+2,2n+4} \quad (14)$$

The parameters L, C, R are defined as functions of the S values at the even points 2n (n=0, 1, . . . ) to ensure that the wavelet transform is reversible, i.e. the $S_{2n+1}$ values can be determined from the $S_{2n}$ and $Y_{2n+1}$ values.

The points n=0, 1, 2, . . . may be the points on a straight line or a curve.

In some embodiments, the linear predictor (3) is replaced with a predictor that gives a greater weight to that value $S_{2n}$ or $S_{2n+2}$ at which the S signal is smoother. This technique tends to provide better prediction if the rate of change of the signal S gradually increases or decreases near the points 2n and 2n+2 (for example, the signal S rises faster and faster between the points 2n-2 and 2n+4).

The weights for $S_{2n}$ and $S_{2n+2}$ can be determined as follows. Let:

$$k_L=1/(1+L) \quad (15.1)$$

$$k_R=1/(1+R) \quad (15.2)$$

Alternatively:

$$k_L=d_{2n+1,2n+2}/(1+L) \quad (15.3)$$

$$k_R=d_{2n,2n+1}/(1+R) \quad (15.4)$$

In either case, $P_{2n+1}$ is calculated as:

$$P_{2n+1}=P^{(3)}_{2n+1}=(k_L S_{2n}+k_R S_{2n+2})/(k_L+k_R) \quad (16)$$

In other words, the weights for $S_{2n}$ and $S_{2n+2}$ are respectively:

$$K_1=k_L/(k_L+k_R),\ K_2=k_R/(k_L+k_R) \quad (17)$$

Of note, the weights $K_1$ and $K_2$ will not change if the coefficients $k_L$ and $k_R$ are multiplied by a positive constant.

The predictor $P^{(3)}$ of equation (16) can be used with edge dependent or edge independent wavelet transforms. One edge dependent transform embodiment uses $P^{(3)}$ if an edge is detected according to conditions (5), (6), and uses the cubic predictor $P^{(1)}$ if an edge is not detected. Use of $P^{(3)}$ is efficient if the predictor calculation circuitry can perform the division operations (15.1), (15.2) or (15.3), (15.4) efficiently. If all of the S values are integers, than the division operations in (15.1), (15.2) are integer operations. If the distances d between the points are integers, the division operations in (15.3), (15.4) are integer operations.

Other choices for the coefficients $k_L$, $k_R$ are possible. These coefficients can be other monotone decreasing functions of L and R respectively. Also, the invention is not limited to defining the weights $K_1$, $K_2$ as functions of $k_L$, $k_R$.

In some embodiments, the data $S_n$ represent an image on a possibly non-flat surface in a three-dimensional space, or the data $S_n$ may represent a multidimensional object (as in the case of tomography). The image may or may not be rectangular, it may have an irregular shape. Suppose each value $S_A$ represents an image property in some area A. Area A consists of one or more points. A wavelet transform replaces the values S with values Y obtained as follows (using a circuit 310 of FIG. 3 for example):

Split. The areas A are divided into two subsets. For example, in the case when the areas A are pixels n=0, 1, ..., one subset can be the sequence of even points 2n, the other subset can be the sequence of odd points 2n+1. We will refer to these subsets as a "first" subset and a "second" subset respectively. The S values on the first subset will be denoted as $S^{(1)}$, and the S values on the second subset as $S^{(2)}$. The Y values on the first subset will be denoted as $Y^{(1)}$, and the Y values on the second subset as $Y^{(2)}$.

Predict. The values $S^{(2)}$ are replaced with the values $Y^{(2)}$ using a predictor P. The prediction is performed by a circuit 320 in FIG. 3. Each value S(2) is replaced with:

$$Y^{(2)}=S^{(2)}-P \text{ or } Y^{(2)}=P-S^{(2)} \tag{18}$$

Update. The values $S^{(1)}$ are replaced with the values $Y^{(1)}$ by a circuit 330. In one example, $Y^{(1)}=S^{(1)}$, for instance, $Y_{2n}=S_{2n}$ for the wavelet transforms discussed above with respect to equations (1)–(17). If the equations (14), (15.3), (15.4) are used for large areas A, the distances between two areas can be defined as distances between selected points in the respective areas. The selected point may be a center of each area if the area has a center. The invention is not limited to any particular point selection.

In another example, the Y values are "lifted" so that the average of the $Y^{(1)}$ values is equal to the average of all of the S values, or the average of powers 1 through k (for some k) of the $Y^{(1)}$ values is equal to the average of powers 1 through k of the S values (i.e. the kth moments are preserved). The lifting is performed to improve the restored image quality if the image is restored without using the $Y^{(2)}$ values. The lifting involves computation of the $Y^{(1)}$ values as a function of the $S^{(1)}$ and $Y^{(2)}$ values. For example, for the linear transform (3):

$$Y_{2n}=S_{2n}+\frac{1}{2}(Y_{2n-1}+Y_{2n+1}) \tag{19}$$

See "Wavelets and the Lifting Scheme, A 5 Minute Tour", by W. Sweldens, Department of Computer Science, Katholieke Universiteit Leuven, Celetijnenlaan 200A, B 3001 Heverlee, Belgium, incorporated herein by reference.

The values S can be extended if needed. For example, if the areas A are pixels n=0, 1, 2, ..., N on a straight line, and the pixels 0 and N are at the ends of the line, then the values $S_{-1}$, $S_{N+1}$, and other values can be defined in some manner for the predict and update operations. In one example, a symmetric periodic extension is performed as in JPEG 2000, with the values $S_{-4}$, $S_{-3}$, $S_{-2}$, $S_{-1}$ being defined respectively as $S_4$, $S_3$, $S_2$, $S_1$, and with the values $S_{N+1}$, $S_{N+2}$, $S_{N+3}$, $S_{N+4}$ defined respectively as $S_{N-1}$, $S_{N-2}$, $S_{N-3}$, $S_{N-4}$. Other techniques for processing the image boundaries can also be used, whether known or to be invented.

Figure 3:
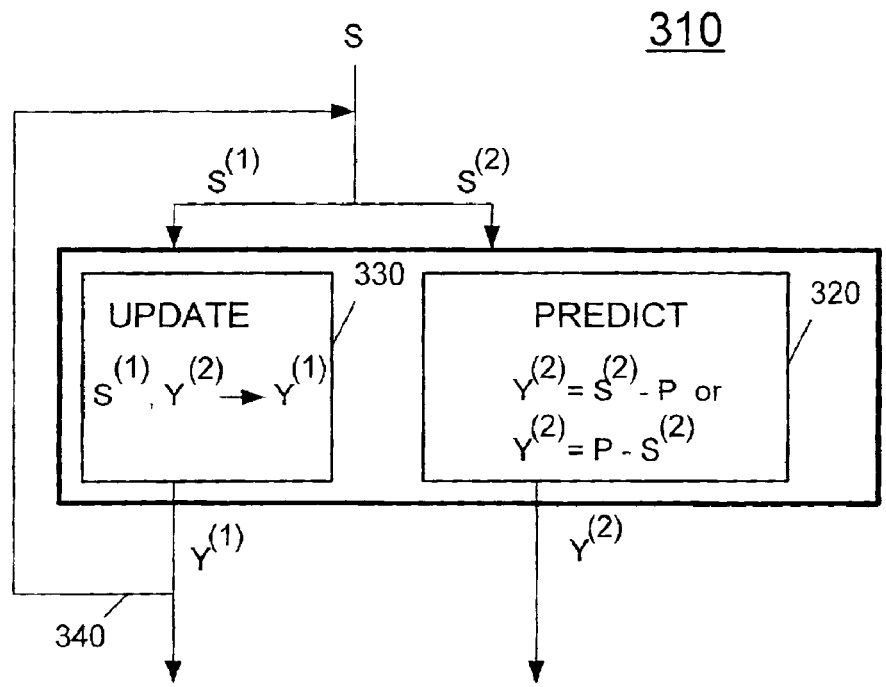
FIGS. 3 and 4 are block diagrams of circuitry performing wavelet transforms in some embodiments of the present invention.

Then compression techniques such as quantization, Huffman coding, Zero Tree coding, or others are applied to the $Y^{(2)}$ values. The $Y^{(1)}$ values can also be compressed, possibly after being processed with another iteration of the wavelet transform (as schematically shown in FIG. 3 by arrow 340). Then another iteration can be performed, and so on, until there is only one value left for which the prediction has not been performed.

A wavelet transform can be performed on an entire image or a portion of an image. For example, if an image is defined on a surface of two or more dimensions, a plurality of coordinate lines can be defined on the image, and a wavelet transform can be performed separately for each coordinate line. An example is given by the JPEG 2000 standard mentioned above. There an image is defined on a plane with a plurality of rows and columns, and the wavelet transform is performed separately for each row to obtain the $Y^{(2)}$ values for the pixels in the odd columns. Then the wavelet transform is performed for each column. The $Y^{(2)}$ values obtained for all of the rows and columns can be combined and compressed together. The $Y^{(1)}$ values can also be combined in some manner for subsequent processing.

The interpolation techniques described above can provide good results when applied to a signal S correlated in time. The samples $S_0$, $S_1$, etc. can be the values of the signal S at consecutive points of time. In some embodiments, the signal can be defined in a space having both positional and time coordinates. For example, the signal S may represent a sequence of pictures taken at consecutive points of time (e.g. in cinema or ultrasound imaging). A wavelet transform can be performed separately in each positional or time coordinate.

We note that the term "compression" has been used to denote a sequence of operations including a wavelet transform, for example: (1) transformation from RGB to $YC_bC_r$, (2) a wavelet transform on the $YC_bC_r$ data, (3) quantization, and (4) encoding of data using variable length coding, run length compression, or some other technique. We use the term "compression" to denote the operations that follow the wavelet transform (e.g. quantization and encoding). The invention is not limited by any particular terminology, or by any encoding or other processing techniques that can be used with a wavelet transform.

The predict and update operations can be performed with rounding. In some embodiments, all the S values are integers, and the P and Y values are rounded to an integer. The rounding can be performed up, down, to the nearest integer, or in any other way, known or to be invented.

Circuits 320 and 330 can be the same circuit, e.g. a software programmed processor.

To summarize, the forward wavelet transform involves the following operations:

$$Y^{(2)}=S^{(2)}-P \text{ or } Y^{(2)}=P-S^{(2)} \tag{20}$$

$S^{(1)}$ is replaced with $Y^{(1)}$.

The reverse wavelet transform involves restoring the values S from the values Y as follows:

$S^{(1)}$ is recovered from Y $$S^{(2)}=Y^{(2)}+P \text{ or } S^{(2)}=P-Y^{(2)} \tag{21}$$

Figure 4:
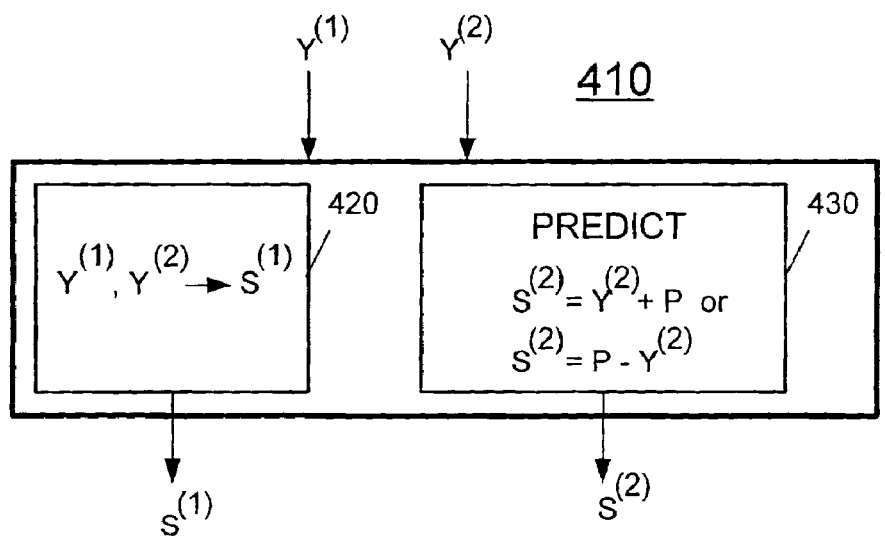

The reverse transform can be performed by circuit 410 (FIG. 4). The $S^{(1)}$ recovery is performed by circuit 420, and the $S^{(2)}$ recovery by circuit 430.

The reverse transform can be performed on the original data set S by setting, at the input of circuit 410:

$$Y^{(1)}=S$$

$$Y^{(2)}=0$$

If the original data S represents a still image, the output of circuit 410 will represent an image magnified by a factor of 2. Repeating the reverse wavelet transform N times will result in magnification by a factor of $2^N$.

For any area A, let SA be the corresponding value of data S. Suppose A1, A2, A3, A4, B are some areas and $S_{A1}$, S, $S_{A3}$, $S_{A4}$, $S_B$ the corresponding S values. The areas A1, A2, A3, A4, B can be points on a line. Suppose the first subset is a sequence of areas including the areas A1, A2, A3, A4 (e.g. the areas A1, A2, A3, A4 can be consecutive even points). Suppose the area B is in the second subset between the areas A2 and A3. Then we can define, by analogy with equations (4) and (14), the parameters L, C, and R indicative of the absolute value of the rate of change of data $S_A$ as A changes from A1 to A2, from A2 to A3, and from A3 to A4 respectively. For example:

$$L=|S_{A2}-S_{A1}|$$

$$C=|S_{A3}-SA_{A2}|$$

$$R=|S_{A4}-S_{A3}| \quad (22)$$

In another example, $$L=|S_{A2}-S_{A1}|/d_{A1,A2}$$

$$C=|S_{A3}-S_{A2}|/d_{A2,A3}$$

$$R=|S_{A4}-S_{A3}|/d_{A3,A4} \quad (22)$$

where there is a point pre-selected in each area for defining a distance, and for any two areas A, B, $d_{A,B}$ is the distance between the pre-selected points in respective areas A, B. The distance may be measured along a straight line, or it may be the shortest distance measured along a curve or a surface. Other definitions for the distance are also possible. For any area A, the value $S_A$ may be the value of the function S at the corresponding pre-selected point. Alternatively, the value $S_A$ may be some average of the function S over the area A, or the value $S_A$ may be defined irrespective of any function defined on individual points of the area A.

The relations (5), (6), (10), (11), (12), (13) can be used for an edge dependent wavelet transform prediction. Also, the equations (15.1), (15.2), (15.3), (15.4), (16), (17) can define a predictor for both edge dependent and edge independent wavelet transforms. Other features of the invention described above in connection with the relations (4) through (17) can also be carried over to this more general case.

The edge detection and prediction techniques described above can be applied to a signal correlated in time. The areas A1, A2, etc. can be points in time. The values L, C, R can represent an absolute change of the signal S or an absolute value of the rate of change of the signal S with respect to time.

The interpolation techniques described above are not limited to wavelet transforms, but can be employed in many digital signal processing applications including photography, moving pictures, ultra sound imaging (tomography), poly-dimension object modeling, and others.

The invention is not limited to the embodiments described above. For example, in a wavelet transform, the calculation operation according to equation (18) involves interpolation but the operation can be performed without calculating the predicted value P as an intermediate value. The values $Y^{(2)}$ can be calculated directly from the values S. The update operation can be performed before predict, or the two operations can be performed in parallel. The invention covers computer readable medium that contains computer instructions to program a computer processor or processors to perform transforms of the present invention. The invention is defined by the appended claims.

What is claimed is:

1. A method for processing digital data that incorporate video and/or audio information, wherein the digital data include a first sequence of digital data values which incorporate video and/or audio information for a sequence of areas, wherein for each area A in the sequence of areas, a corresponding digital data value $S_A$ in the first sequence incorporates video and/or audio information for the area A, wherein the areas A are areas in a space of one or more dimensions, each dimension representative of a physical position or time;

wherein the first sequence includes consecutive digital data values $S_{A1}$, $S_{A2}$, $S_{A3}$, $S_{A4}$ corresponding to areas A1, A2, A3, A4, and the method comprises performing, by a circuit, a data processing operation that incorporates interpolation of the digital data for an area B, wherein performing the data processing operation comprises:

determining, by the circuit, whether or not at least one of relations (i) and (ii) holds true, wherein:

the relation (i) is R>F(C, L) or R≧F(C, L), where:
L is indicative of an absolute value $|S_{A1}-S_{A2}|$ and/or an absolute value of a rate of change of the first sequence from $S_{A1}$ to $S_{A2}$ with respect to at least physical position or time;
C is indicative of an absolute value $|S_{A2}-S_{A3}|$ and/or an absolute value of a rate of change of the first sequence from $S_{A2}$ to $S_{A3}$ with respect to at least physical position or time;
R is indicative of an absolute value $|S_{A3}-S_{A4}|$ and/or an absolute value of a rate of change of the first sequence from $S_{A3}$ to $S_{A4}$ with respect to at least physical position or time;
F(x, y) is a predefined increasing function of x and y;
the relation (ii) is L>F(C, R) or L≧F(C, R);
if at least one of the relations (i) and (ii) is true, then performing, by the circuit, a first operation which involves using a first interpolation for the area B; and
if neither of the relations (i) and (ii) is true, then performing, by the circuit, a second operation, different from the first operation, which involves using a second interpolation for the area B, the second interpolation being different from the first interpolation.

2. The method of claim 1 wherein:

$$L=|S_{A2}-S_{A1}|;$$

$$C=|S_{A3}-S_{A2}|;$$

$$R=|S_{A4}-S_{A3}|.$$

3. The method of claim 1 wherein, for some predefined positive constant k:

the relation (i) is R>k|C+L| or R≧k|C+L|; and
the relation (ii) is L>k|C+R| or L≧k|C+R|.

4. The method of claim 3 wherein 8≦k≦11.

5. The method of claim 1 wherein an interpolated value of the data for the area B according to the first interpolation is:

$$K_1 S_{A2}+K_2 S_{A3}$$

wherein $K_1$ and $K_2$ are real numbers.

6. The method of claim 5 wherein $K_1=K_2=½$.

7. The method of claim 5 wherein $K_1$ and $K_2$ are functions of L and R such that:

if L<R, then $K_1>K_2$; and
if R<L, then $K_2>K_1$.

8. The method of claim 7 wherein:

$$K_1=k_1/(k_1+k_2);$$

$$K_2=k_2/(k_1+k_2);$$

$$k_1=c_1/(1+L); \text{ and}$$

$$k_2=c_2/(1+R);$$

where c1 and c2 are positive numbers, and c1=c2 and/or c1=k*$d_{B,A3}$ and c2=k*$d_{A2,B}$ where k is a positive constant, $d_{B,A3}$ is the distance between a selected point in area B and a selected point in area A3, and $d_{A2,B}$ is the distance between the selected point in area B and a selected point in area A2.

9. The method of claim 1 wherein:

the areas A1, A2, A3, A4, B are points on a line;

an interpolated value of the data for the area B according to the first interpolation is:

$$K_1 S_{A2} + K_2 S_{A3}$$

wherein $K_1$ and $K_2$ are real numbers; and an interpolated value of the data for the area B according to the second interpolation is a value of a polynomial of an order at least three at the point B, the polynomial having the values $S_{A1}, S_{A2}, S_{A3}, S_{A4}$ at respective points A1, A2, A3, A4.

10. The method of claim 1 further comprising:

determining by the circuit, for each area A, a transformed data value $Y_A$, wherein the transformed data values $Y_{A1}, Y_{A2}, Y_{A3}, Y_{A4}, Y_B$ for the respective areas A1, A2, A3, A4, B are determined as:

$Y_B = S_B - P_B$, where $S_B$ is a non-interpolated data value for the area B and $P_B$ is an interpolated data value obtained for the area B in said interpolation; and $Y_{A1}, Y_{A2}, Y_{A3}, Y_{A4}$ are either equal respectively to $S_{A1}, S_{A2}, S_{A3}, S_{A4}$ or are defined by the data values of the first sequence and interpolated data values obtained from the data values of the first sequence; and the method further comprises compressing the values Y.

11. The method of claim 1 wherein:

the values $S_{A1}, S_{A2}, S_{A3}, S_{A4}$ have been obtained by the circuit from transformed values Y, wherein each transformed value Y corresponds to one of the areas; and the method further comprises determining an interpolated value $P_B$ in said interpolation, and determining by the circuit a non-interpolated data value $S_B$ for the area B, wherein $S_B$ is determined as: $S_B = Y_B + P_B$.

12. A circuit for performing the method of claim 1.

13. A circuit for performing the method of claim 3.

14. A circuit for performing the method of claim 5.

15. A circuit for performing the method of claim 7.

16. A circuit for performing the method of claim 8.

17. A computer readable medium comprising computer instructions for performing the method of claim 1.

18. A computer readable medium comprising computer instructions for performing the method of claim 3.

19. A computer readable medium comprising computer instructions for performing the method of claim 5.

20. A computer readable medium comprising computer instructions for performing the method of claim 7.

21. A computer readable medium comprising computer instructions for performing the method of claim 8.

* * * * *